United States Patent [19]
Daouse et al.

[11] Patent Number: 5,750,170
[45] Date of Patent: May 12, 1998

[54] PROCESS FOR PROVIDING FILLED, EXTRUDED DOUGH PRODUCTS

[75] Inventors: Alain Daouse, Noailles; Alain Plessier, Bresles, both of France

[73] Assignee: Nestec S.A., Vevey, Switzerland

[21] Appl. No.: 576,273

[22] Filed: Dec. 21, 1995

[51] Int. Cl.[6] .................................................. A21D 13/00
[52] U.S. Cl. .................. 426/283; 426/94; 426/138; 426/284; 426/516; 426/518; 426/549; 425/289; 425/315
[58] Field of Search ................... 426/94, 283, 284, 426/549, 516, 518, 138; 425/289, 315

[56] References Cited

U.S. PATENT DOCUMENTS

| 4,574,690 | 3/1986 | Chiao et al. | 426/283 |
|---|---|---|---|
| 4,659,580 | 4/1987 | Svengren | 426/516 |
| 4,664,027 | 5/1987 | Pauron | 99/450.6 |
| 4,689,236 | 8/1987 | Pinto | 426/502 |
| 4,748,031 | 5/1988 | Koppa | 426/284 |
| 4,882,185 | 11/1989 | Simelunas et al. | 426/516 |
| 4,941,402 | 7/1990 | D'Alterio | 99/450.6 |
| 5,037,350 | 8/1991 | Richardson et al. | 452/174 |
| 5,216,946 | 6/1993 | Huang et al. | 99/353 |
| 5,538,744 | 7/1996 | Miller et al. | 426/94 |

FOREIGN PATENT DOCUMENTS

| 162675 | 5/1985 | European Pat. Off. |
| 41 40 217 | 9/1993 | Germany |

*Primary Examiner*—Lien Tran
*Attorney, Agent, or Firm*—Pennie & Edmonds

[57] ABSTRACT

A process for the production of filled dough products in which dough and a filling are co-extruding to provide a filled tube of the dough surrounding the filling. The filled tube is then transported on a movable support. While being transported, the filled tube is cut into segments using a plurality of blades which move with the filled tube and which progressively cut into the filled tube with progressive movement of the filled tube so that filling in the portion of the tube to be cut is progressively pushed out of this portion prior to cutting when the blade engages the moving support.

13 Claims, 3 Drawing Sheets

PROCESS FOR PROVIDING FILLED, EXTRUDED DOUGH PRODUCTS

FIELD OF THE INVENTION

This invention relates to food products that have a dough coating containing a filling and a process for the production of the food. The invention also relates to apparatus for producing the filled dough products.

BACKGROUND OF THE INVENTION

The production of filled dough products on a continuous basis is difficult. One conventional way of producing these products is to produce two sheets of dough and then place discrete portions or a layer of filling on one of the sheets. The other sheet is then placed over the first and the laminated dough is cut into rectangles or squares. Particularly the cutting of the sheets is done by hand or by stepwise operation; both slow processes. Also scraps of dough are invariably produced, leading to wastage.

A procedure for automating this process is described in U.S. Pat. No. 4,941,402. Here one sheet of dough is transported on a conveyor to a filling station at which streams of filling are placed on the sheet; the streams being arranged in parallel along the length of the sheet. The coated sheet is then transported to a rotating cylinder in a manner such that the coated sheet moves over the cylinder and downwardly with the rotation of the cylinder. The other dough sheet is rotated through 180° on a pocket forming cylinder, by means of which small pockets are pressed into the sheet. The pocketed sheet is then pressed onto the coated sheet with the pockets receiving the filling on the coated sheet. A cutting roller then cuts the sheets between the pockets. A problem with this process is that not all the filling is pushed from between the sheets at the joints of the pockets. Hence improper sealing of the pockets can occur, as well as sticking of the sheets to the cylinders and rollers. Also the dough must have sufficient strength to be able to be worked over a number of cooperating rollers. Not all doughs have this strength.

Alternatively, the food product can be produced in the form of an extruded rope. This is done by co-extruding the dough and the filling with the dough arranged concentrically around the filling. An apparatus to produce food products in this manner is described in European patent application 0 162 675. Here the extruded rope is first pinched into segments using a pair of cooperating rollers, and then the segments are separated using arcuate cutters decending from above. Again however, some filling may remain in the areas to be cut resulting in improper sealing and sticking.

SUMMARY OF THE INVENTION

It is therefore an object of this invention to provide a process for the continuous production of filled dough products which is simple and which has a low degree of improper sealing of the dough. It is also an object to provide an apparatus for use in the process.

Accordingly, in one aspect this invention provides a process for the production of filled dough products comprising:

co-extruding dough and a filling to provide a filled tube of the dough surrounding the filling;

transporting the filled tube on a movable support through a cutting station having a plurality of movable blades spaced from one another a distance corresponding to a selected length of the filled dough product; and cutting the filled tube by causing the plurality of blades to move with the filled tube and progressively towards the movable support and into the filled tube with progressive movement of the filled tube through the cutting station, whereby the filling in any portion of the tube engaged by a blade is progressively pushed out of this portion prior to cutting when the blade engages the moving support.

The invention therefore has the advantage that the blades slowly stretch the dough at the portions of the filled tube to be cut with progressive movement of the filled tube and this causes the filling in this portion to be pushed out of this portion. In tests done using the process, almost no improper sealing and sticking is observed; even at speeds of 200 cuts per minute. Also the process is continuous and hence does not require inefficient stepwise operations. Further, there is no wastage.

Preferably, each segment of the filled tube between the portions to be cut is caused to progressively take on a convex shape opposite the blades with progressive movement of the filled tube to further accentuate constriction of the filled tube at the portions to be cut. This may be achieved by providing concave depressions in the movable support of size equal to the desired length of the segments.

To improve the handling properties of the filled tube, the filled tube may be coated with ultra fine semolina prior to being cut.

In another aspect this invention provides a filled dough product comprising a tube of extruded dough material having a pair of opposing ends and containing a filling; each end of the tube comprising a flattened, stretched portion of dough material, from which filling material has been forced, pressure sealed together. The filled dough product may be deep fried and/or frozen.

In a further aspect, this invention provides a cutting apparatus for continuously cutting dough strands, the apparatus comprising:

an endless support conveyor to transport the dough strand; and an endless cutting conveyor positioned above the support conveyor and carrying a plurality of blades spaced from each other along the length of the cutting conveyor, the distance between adjacent blades being equal to the desired length of the segments, and the cutting conveyor being inclined downwardly in the direction of transport of the support conveyor so that each blade moves downwardly towards the support conveyor with progressive movement along the cutting conveyor to finally engage the support conveyor and cut the dough strand.

The apparatus is advantageously simple and its use results in little or no manipulation of the dough; enabling a wide range of doughs to be processed. Also it is capable of operating at high speeds yet maintaining good sealing of the dough when the filled tube is cut into segments. Hence the apparatus is a significant improvement over the art.

The cutting apparatus is particularly useful for cutting filled tubes of dough; although it may be used to cut any stranded dough product.

Preferably the cutting conveyor is inclined downwardly at an angle in the range of 2° to 30° to the support conveyor. More preferably, the angle is in the range of 5° to 20°, for example about 10°.

Preferably, the support conveyor carries a plurality of raised support plates spaced from each other along the length of the support conveyor; the distance between the center of one support plate and the center of an adjacent support plate being substantially equal to the desired length of the segments. Even more preferably, each support plate is raised at its center and slopes concavely away to its leading and trailing edges.

The support plates may be in the form of elongated bars which extend transverse the support conveyor. In this way, a plurality of filled tubes may be loaded on the support conveyor and transported in parallel through the cutting apparatus. Similarly, the blades may each comprise an elongate bar which extends transverse of the cutting conveyor; the bar having a raised cutting edge extending along its length. Preferably, the cutting edge has a shoulder portion at its base.

Preferably the support conveyor and the cutting conveyor are each made up of a plurality of chains arranged in parallel; the support plates and the blades being affixed to and extending across the chains.

It will be appreciated that the invention may be used to produce a wide range of food products. One example of a food product is a savoury snack comprising a dough casing containing a savoury filling. After cutting, the snack may be deep fried and then frozen; the user heating up the snack in a microwave or conventional oven. Other examples are filled pasta products, products containing a sweet filling and the like. It will also be appreciated that the cutting apparatus can be used to cut unfilled dough products.

BRIEF DESCRIPTION OF THE DRAWINGS

An embodiment of the invention is now described, by way of example only, with reference to the drawings in which.

DETAILED DESCRIPTION OF PREFERRED EMBODIMENTS

Figure 1:
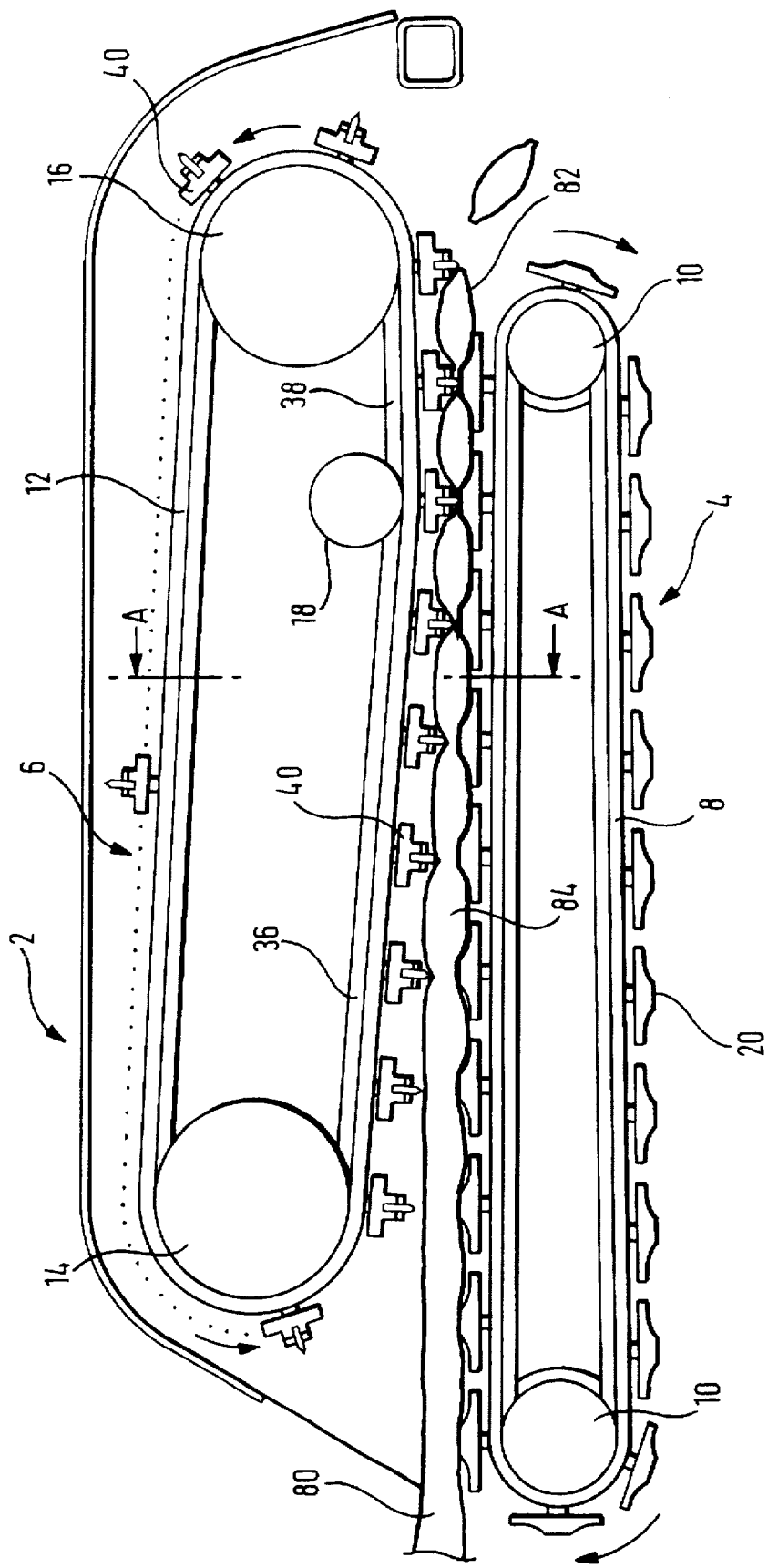
FIG. 1 is a cross-section of the cutting apparatus.

The cutting apparatus 2 consists of two endless conveyors; a support conveyor 4 and a cutting conveyor 6 arranged above the support conveyor 4.

The support conveyor 4 consists of three endless chains 8 each strung about two return pulleys 10; one return pulley 10 at each end of the support conveyor 4. The return pulleys 10 are arranged such that the support conveyor 4 extends substantially horizontally; although suitable inclinations to the horizontal are also acceptable. The endless chains 8 are spaced from one another and arranged in parallel with the axes of the return pulleys 10 at each end of the support conveyor 4 being connected. A plurality of cutting support plates 20 are connected to and extend transversely to the endless chains 8, spaced from one another an equal distance along the chains 8.

Figure 2:
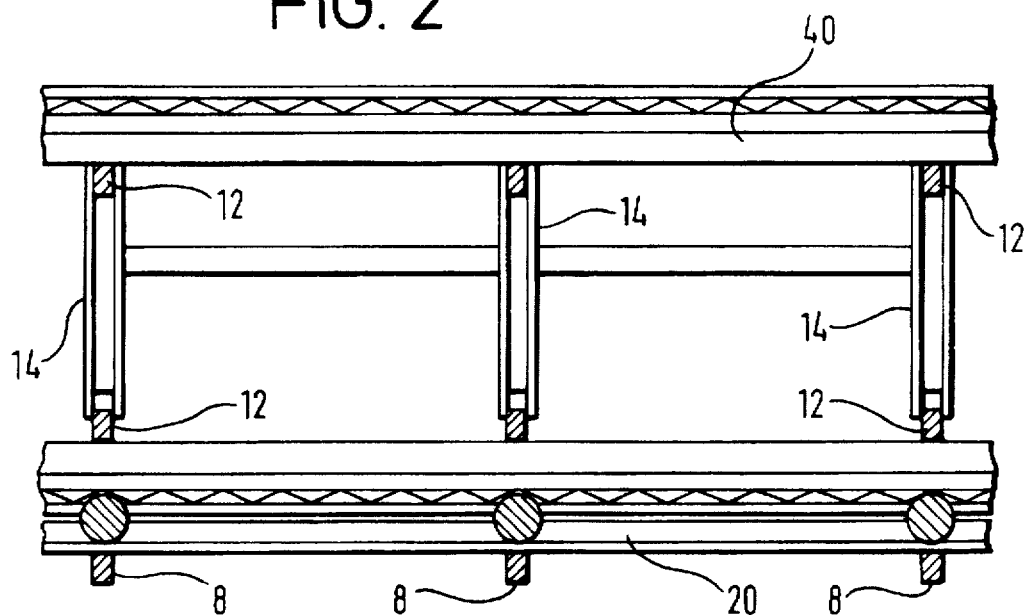
FIG. 2 is a cross section along line A—A in FIG. 1.
Figure 3:
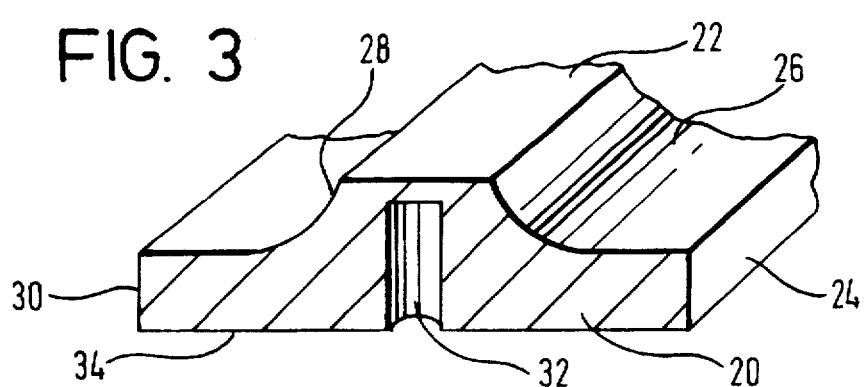
FIG. 3 is a part-cross section perspective of a support plate.

As is best illustrated in FIGS. 2 and 3, each cutting support plate 20 is in the form of an elongated bar which is of length at least equal to the distance between the two outermost chains 8 of the support conveyor 4. A raised support 22 extends along the center of the support plate 20 and is connected to the leading edge 24 of the support plate 20 by a concave leading surface 26. A concave trailing surface 28 extends from the opposite edge of the raised support 22 to the trailing edge 30 of the support plate 20. The distance from the center of the raised support 22 of one support plate 20 to the center of the raised support 22 of an adjacent support plate 20 is substantially equal to the desired length of the food product. A plurality of screw bores 32 (only one is shown) are provided in the back surface 34 of the support plate 20 along the center-line of the support plate 20. A bolt (not shown) may be threaded in the screw bore 32 to affix the support plate 20 to the endless chains 8. The support plate 20 is made of stainless steel (for example AISI 304L) or any other suitable material.

The cutting conveyor 6 consists of three endless chains 12 each strung about two return pulleys; an upstream return pulley 14 at one end and downstream return pulley 16 at the opposite end of the cutting conveyor 6. The cutting conveyor 6 also has a force pulley 18 positioned between the upstream return pulley 14 and the downstream return pulley 16. The upstream return pulleys 14 are positioned slightly above the downstream return pulleys 16 so that the chains 12 each extend downwardly from the upstream return pulleys 14 to the downstream return pulleys 16.

The force pulleys 18 are positioned near the downstream return pulleys 16 and a little beneath the downstream return pulleys 16. In this way, the portion of each endless chain 12 beneath the return pulleys has a longer portion 36 inclining downwardly from the upstream return pulley 14 to the force pulley 18 and a shorter portion 38 inclining upwardly from the force pulley 18 to the downstream return pulley 16. The longer portion 36 inclines downwardly at a shallow angle of about 5 to 20% with respect to the support conveyor 4 beneath it. The endless chains 12 are spaced from one another and arranged in parallel with the axes of the upstream return pulleys 14 connected, the axes of the downstream return pulleys 16 connected and the axes of the force pulleys 20 connected.

Figure 4:
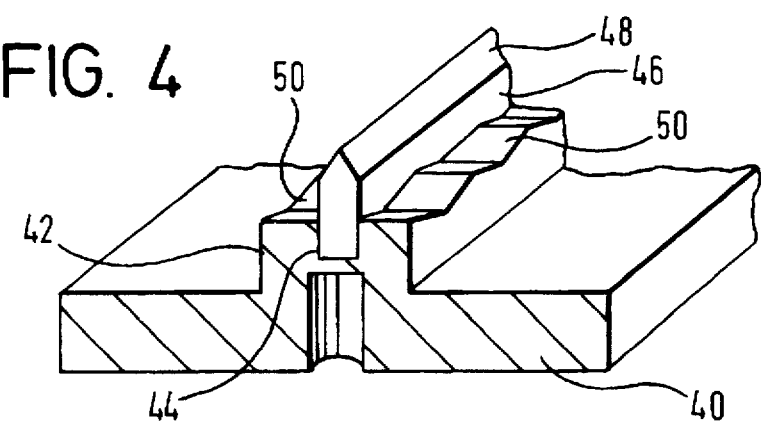
FIG. 4 is a part-cross section perspective of a cutting plate.

A plurality of cutters 40 are connected to and extend transversely to the endless chains 12; spaced from one another an equal distance along the chains 12. As is best illustrated in FIGS. 2 and 4, each cutter 40 is in the form of an elongated bar which is of length at least equal to the distance between the outermost chains 12 of the cutting conveyor 6. A ridge 42 extends along the centerline of each cutter 40 and in turn has a recess 44 extending along its centerline. An elongate cutting blade 46 is fixed in the recess 44. The cutting blade 46 terminates in a sharp cutting edge 48 which projects well clear of the ridge 42. A serrated shoulder 50 is formed into the ridge 42 on each side of the cutting blade 46. The opposing faces of any serration of the serrated shoulders 50 face one another at angle of about 120°. A plurality of screw bores 52 (only one is shown) are provided in the back surface 54 of the cutter 40 along the center-line of the cutter 40. A bolt (not shown) may be threaded in the screw bore 52 to affix the cutter 40 to the endless chains 12. The cutter 40 is made of plastics such as polyethylene or any other suitable non-stick material. The cutting blade 46 is made of stainless steel, for example AISI 304L, or any other suitable material.

The distance between the blades 46 of each pair of adjacent cutters 40 on any chain 12 is equal to a desired length of food product. Also, the chains 8 and 12 are synchronized so that, when any cutter 40 reaches a position beneath the force pulley 18, a cutting support plate 20 is positioned beneath the cutter 40. Clearly, if the chains 8 are the same length as the chains 12, the number of cutters 40 on each chain 12 should be equal to the number of cutting support plates 20 on the corresponding chain 8. The force pulley 18 is positioned a distance above the support conveyor 4 such that the cutting edge 48 of the blade 46 of the cutter 40 directly beneath the force pulley 18 contacts the raised support 22 of the cutting support plate 20 beneath the force pulley 18. In this way, a cutting mechanism is provided.

The chains 8 and 12 are driven by servo motors (not shown) which enable rapid and accurate adjustment of the speed of the chains 8 and 12 such that synchronization of the chains 8 and 12 may be ensured. The servo motors may be connected to suitable process control systems (not shown) to monitor and correct the speeds of the chains 8 and 12.

Figure 5:
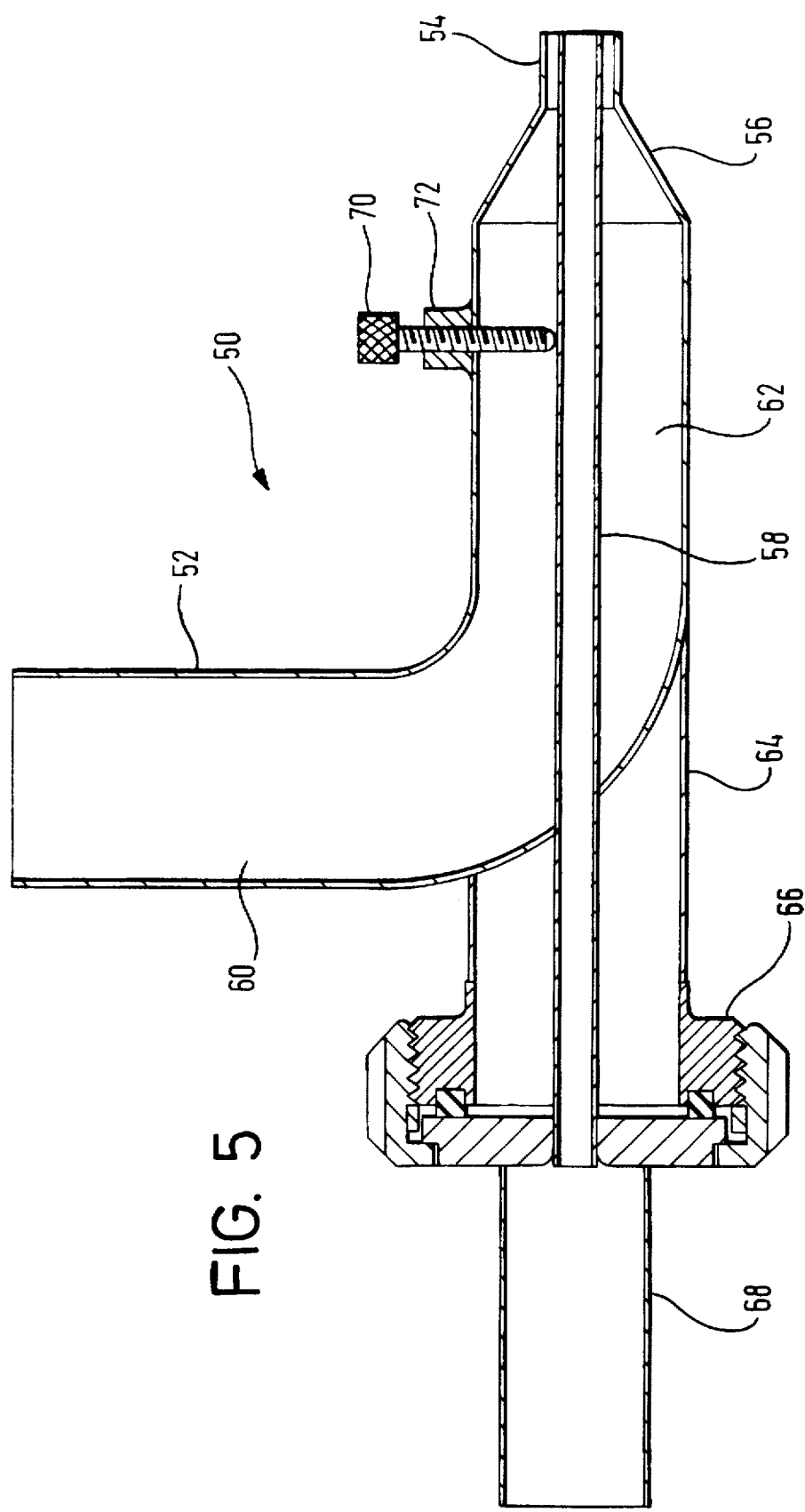
FIG. 5 is a cross-section of an extrusion nozzle.

Referring now to FIG. 5, a nozzle 50 for co-extruding a food product in the form of a filled tube is formed of an outer tube 52 which is bent in the form of an elbow to define an inlet portion 60 and an outlet portion 62. The outer tube 52 is of substantially constant diameter over its length but terminates in an outlet nozzle 54 of reduced diameter at the end of the outlet portion 62. An inwardly tapering intermediate portion 56 connects the outlet nozzle 54 to the remainder of the outer tube 52.

An inner tube 58 extends along the axis of the outlet portion 62, from the outlet nozzle 54 rearwardly and out through the bend of the outer tube 52. The inner tube 58 is of constant diameter which is less than the diameter of the outlet nozzle 54. The joint of the inner tube 58 and the outer tube 52 at the bend is sealed. A connecting pipe 64 projects from the bend of the outer tube 52, about the portion of the inner tube 58 external of the outer tube 52 and concentric with it. A suitable connector 66 is fixed to the distal end of the connector pipe 64 and the inner tube 58 so that a feed pipe 68 may be connected to the inner tube 58. A similar connector (not shown) is connected to the free end of the inlet portion 60 of the outer tube 52.

An adjustment screw 70 is threaded through a fitting 72 fixed adjacent the intermediate portion 56 of the outer tube 52 to project into the outer tube 52. The distal end of the adjustment screw 70 abuts the inner tube 58. Hence, adjustment of the adjustment screw 70 causes adjustment of the position of the inner tube 58 in the outlet nozzle 54. A further adjustment screw (not shown) may be positioned to extend at right angles to the adjustment screw 70 to together provide for vertical and horizontal adjustment of the inner tube 58.

In use, several nozzles 50, aligned in parallel, are positioned downstream of the cutting apparatus 2. A food filling is pumped or extruded into the inner tube 58 and a dough is pumped or extruded into the outer tube 52. The dough is then extruded from the outlet nozzle 54 of each nozzle 50, about the food filling, in the form of a filled tube 80. The filled tube 80 is deposited on the support conveyor 4 where it is carried by the support plates 20. As the filled tube 80 is conveyed along the support conveyor 4, due to its elasticity, it progressively sags between adjacent support plates 20. This sagging continues until, once the filled tube 80 reaches the downstream end of the support conveyor 4, the lower surface of the filled tube 80 rest on the concave leading and trailing surfaces 26 and 28 of the support plates 20. In this way, the filled tube 80 is made up of connected segments 82 each having a lengthwise arcuate lower surface. This procedure causes some stretching and narrowing of the filled tube 80 at the joint 84 between adjacent segments 82, in turn tending to force the filling in the joint 84 to flow into the adjacent segments 82.

While this is proceeding, the cutting conveyor 6 is also moving (counterclockwise in the apparatus illustrated in the drawings while the support conveyor moves clockwise). Due to the slight downward angle of inclination of the longer portion 36 of the cutting conveyor 6, the cutters 40 move downwardly as they move along the cutting conveyor 6.

Once any cutter reaches some selected point intermediate the length of the cutting conveyor 6, the cutting blade 46 of the cutter 40 engages the filled tube 80 at a joint 84 between two segments 82. Further movement of the cutter 40 along the cutting conveyor 6 causes the blade 46 to bite deeper into the joint 84 of the filled tube 80. However, since the longer portion 36 of the cutting conveyor 6 is inclined at a shallow angle, the progressive biting of the blade 46 into the joint 84 occurs slowly and progressively. Hence, a slow stretching of the joint 84 occurs as well as a slow pushing out of the filling from the joint 84 into the adjacent segments 82. Once any joint 84 reaches a position beneath the force pulley 18, very little if any filling remains in the joint 84. At this point, the cutting edge 48 of the cutting blade 46 cuts completely through the joint 84 by cuttingly engaging the raised support 22 of the support plate 20 beneath the cutter 40. Shortly after the force pulley 18, the support conveyor 4 returns permitting the cut segments 82 to fall onto further transport means or unit process means (not shown) for further processing.

EXAMPLE 100 parts by weight of ordinary wheat flour, 20 parts by weight powdered lactoserum (pH 6.2), 3 parts by weight baking powder and 5 parts by weight egg powder are mixed in an Artofex kneading machine for 2 to 3 minutes. Between 25 to 30% by weight cold water at 15° to 16° C. is then added to the kneading machine and the machine operated at speed II for 5 to 7 minutes. Once removed from the kneading machine, the dough is very supple and is used within the hour.

A filling is then prepared by adding precooked meat, that has been chopped into 3 mm pieces, to a selected sauce. The sauce is then cooked. The filling is then cooled to less than 4° C.

The dough is then fed into a Handtmann screw extruder of capacity between 50 to 500 kg/h from where it is transported to a distributor which divides the dough into six streams. The filling is fed into a MIM screw pump of 25 to 250 kg/hour capacity from where it is pumped to a distributor which divides the filling into six streams. Each stream of dough and filling is fed to a nozzle 50.

Six nozzles 50 are arranged after the distributors. Each nozzle 50 has an outer tube 52 of diameter of 38 mm and an inner tube 58 of inner diameter of 6 mm and outer diameter of 8 mm. The outlet nozzle 54 of each nozzle 50 has an inner diameter of 11.7. The dough is pushed from the dough distributor into the outer tube 52 of each nozzle 50 and the filling is pumped from the filling distributor into the inner tube 58 of each nozzle 50. The six filled tubes 80 leaving the nozzles are then dusted with ultra fine semolina and conveyed to a cutting apparatus 2.

The support conveyor 4 of the cutting apparatus 2 has three chains 8 arranged in parallel and spaced from each other (center to center) by about 165 mm. The chains 8 are made up of links of 9.52 mm. Each support plate 20 is 600 mm long and has a maximum thickness of about 5 mm. The cutting conveyor 4 of the cutting apparatus 2 has three chains 12 arranged in parallel and spaced from each other (center to center) by about 165 mm. The chains 12 are made up of links of 9.52 mm. Each cutter 40 is 600 mm long and has a maximum thickness at the cutting edge 48 of about 13 mm. The cutters 40 are spaced from adjacent cutters 40 along the chain by 38.08 mm. The cutting apparatus 2 is operated at a speed of 500 m/h. Each stream of filled tube 80 is transported along the cutting apparatus 2 and then cut into segments 82 of about 38 mm. No losses due to sticking or improperly cut filled tubes 82 are observed. The segments 82 fall into a deep frying apparatus where they are deep fried. Thereafter the fried segments are cooled, bagged and frozen.

It is to be understood that the invention is not limited to the embodiments described and that numerous variations and modifications may be made. For example, more or less than three chains may be used for each of the support conveyor 4 and the cutting conveyor 6. Also, chains need not be used at all; particularly for the support conveyor 4. Instead conveyor belts may be used. It is also not necessary to have a single force pulley 18 for each chain 12. several force pulleys 18 may be used to provide for longer action cutting. Further, the force pulley 18 need not be positioned below the downstream return pulley 16; instead its lower surface may be at the same level as the lower surface of the downstream return pulley 16. In this case, the shorter portion 38 of each chain 12 will not be inclined upwardly. It is also possible to dispense with the force pulleys 18 entirely; in this case the downstream return pulleys 16 would perform the function of the force pulleys 18. Also, the leading and trailing surfaces 26 and 28 of the support plate 20 need not be concave; instead they may taper down to the edges of the support plate 20. Further, rigid support plates (not shown) may be positioned behind the longer portion 36 of the cutting conveyor 6 to ensure steady, even movement of the cutters 40 into the filled tube 80.

What is claimed is:

1. A process for the production of filled dough products comprising:
    co-extruding dough and a filling to provide a filled tube of the dough surrounding the filling;
    transporting the filled tube on a movable support through a cutting station having a plurality of movable blades spaced from one another by a distance corresponding to a selected length of the filled dough product, a lower surface of the filled tube being supported by the movable support;
    causing the lower surface of the filled tube, between adjacent portions to be engaged by a movable blade, to progressively take on a convex shape with progressive movement of the filled tube; and
    cutting the convex shaped filled tube by causing the plurality of blades to move with the filled tube and progressively towards the movable support and into the filled tube with progressive movement of the filled tube through the cutting station, whereby the filling in any portion of the tube engaged by a blade is progressively pushed out of this portion prior to cutting when the blade engages the moving support.

2. A process according to claim 1 in which the plurality of blades move progressively towards the movable support at an angle in the range of 2° to 30°.

3. A process according to claim 2 in which the plurality of blades are carried on an endless conveyor arranged above the movable support and inclined downwardly at an angle of 2° to 30° to the movable support.

4. A process according to claim 2 in which the movable support comprises an endless support conveyor carrying a plurality of raised support plates spaced from each other along the endless support conveyor; the distance between the center of one support plate and the center of an adjacent support plate being substantially equal to the selected length of the filled dough products; the lower surface of the filled tube taking on the convex shape by sagging between adjacent support plates to cause stretching and narrowing of the filled tube and the formation of joints between adjacent filled tube segments.

5. A process according to claim 4 wherein the blades contact the filled tube at the joints between filled tube segments to cut the tube without significant loss of filling.

6. A process according to claim 1 further comprising coating the filled tube with ultra fine semolina prior to transporting the filled tube through the cutting station.

7. A process according to claim 1 further comprising deep frying the filled dough products.

8. A process for the production of filled dough products comprising:
    co-extruding dough and a filling to provide a filled tube of the dough surrounding the filling;
    transporting the filled tube on a movable support through a cutting station having a plurality of movable blades spaced from one another by a distance corresponding to a selected length of the filled dough product:
    causing a surface of the filled tube opposite the movable blades, between adjacent portions to be engaged by a movable blade, to progressively take on a convex shape with progressive movement of the filled tube: and
    cutting the convex shaped filled tube by causing the plurality of blades to move with the filled tube and progressively towards the movable support and into the filled tube with progressive movement of the filled tube through the cutting station, whereby the filling in any portion of the tube engaged by a blade is progressively Rushed out of this portion prior to cutting when the blade engages the moving support;
    wherein the movable support comprises an endless support conveyor carrying a plurality of raised support plates spaced from each other along the endless support conveyor with the filled tube taking on a convex shape by sagging between adjacent support plates.

9. A process according to claim 8 in which the plurality of blades move progressively towards the endless support conveyor at an angle in the range of 2° to 30°.

10. A process according to claim 9 in which the plurality of blades are carried on an endless cutting conveyor arranged above the endless support conveyor and inclined downwardly at an angle of 2° to 30° to the endless support conveyor.

11. A process for the production of filled dough products comprising:
    co-extruding dough and a filling to provide a filled tube of the dough surrounding the filling;
    transporting the filled tube on a movable support through a cutting station having a plurality of movable blades spaced from one another a distance corresponding to a selected length of the filled dough product, a lower surface of the filled tube being supported by the movable support; and
    cutting the filled tube by causing the plurality of blades to move with the filled tube and progressively towards the movable support at an angle of 2° to 30° and into the filled tube with progressive movement of the filled tube through the cutting station; and
    simultaneously causing the lower surface of the filled tube between adjacent portions engaged by a blade to progressively take on a convex shape with progressive movement of the filled tube;
    whereby the filling in any portion of the tube engaged by a blade is progressively pushed out of this portion prior to cutting when the blade engages the moving support.

12. A process according to claim 11 in which the movable support comprises an endless support conveyor carrying a plurality of raised support plates spaced from each other along the endless support conveyor; the distance between the center of one support plate and the center of an adjacent support plate being substantially equal to the selected length of the filled dough products; the lower surface of the filled tube taking on the convex shape by sagging between adjacent support plates to cause stretching and narrowing of the filled tube and the formation of joints between adjacent filled tube segments.

13. A process according to claim 12 wherein the blades contact the filled tube at the joints between filled tube segments to cut the tube without significant loss of filling.

* * * * *